US010120397B1

(12) United States Patent
Zakhor et al.

(10) Patent No.: US 10,120,397 B1
(45) Date of Patent: Nov. 6, 2018

(54) INTERIOR CLIMATE CONTROL UTILIZING MULTIMODAL SENSOR POSITIONING

(71) Applicant: INDOOR REALITY, Berkeley, CA (US)

(72) Inventors: Avideh Zakhor, Berkeley, CA (US); Joseph Menke, Berkeley, CA (US); Plamen Levchev, Berkeley, CA (US)

(73) Assignee: INDOOR REALITY INC., Berkeley, CA (US)

( * ) Notice: Subject to any disclaimer, the term of this patent is extended or adjusted under 35 U.S.C. 154(b) by 290 days.

(21) Appl. No.: 15/042,074

(22) Filed: Feb. 11, 2016

(51) Int. Cl.
| | |
|---|---|
| *G05B 21/00* | (2006.01) |
| *G05D 23/13* | (2006.01) |
| *F24F 11/30* | (2018.01) |
| *F24F 11/70* | (2018.01) |
| *F24F 11/62* | (2018.01) |
| *F24F 11/56* | (2018.01) |
| *F24F 11/63* | (2018.01) |
| *F24F 120/12* | (2018.01) |
| *F24F 120/10* | (2018.01) |
| *F24F 130/10* | (2018.01) |
| *F24F 11/46* | (2018.01) |
| *F24F 110/00* | (2018.01) |

(52) U.S. Cl.
CPC .......... *G05D 23/1393* (2013.01); *F24F 11/30* (2018.01); *F24F 11/62* (2018.01); *F24F 11/70* (2018.01); *F24F 11/46* (2018.01); *F24F 11/56* (2018.01); *F24F 11/63* (2018.01); *F24F 2110/00* (2018.01); *F24F 2120/10* (2018.01); *F24F 2120/12* (2018.01); *F24F 2130/10* (2018.01)

(58) Field of Classification Search
None
See application file for complete search history.

(56) References Cited

U.S. PATENT DOCUMENTS 9,525,976 B2 *  12/2016  Dharwada ............... H04W 4/20

OTHER PUBLICATIONS

Avideh Zakhor, Multi-Modal Indoor Positioning of Mobile Devices, 2015 International Conference on Indoor Positioning and Indoor Navigation (IPIN), Oct. 13-16, 2015, Banff, Alberta, Canada.

* cited by examiner

*Primary Examiner* — Cory W Eskridge
(74) *Attorney, Agent, or Firm* — Kali Law Group, P.C.

(57) ABSTRACT

Methods for interior climate control of a building utilizing multimodal sensor positioning using an electronic mobile device are presented, the method including: causing the electronic mobile device to receive a building floor plan; generating a number of fingerprint databases corresponding with the building floor plan; determining positions of users each having a mobile electronic device in the building; receiving occupancy climate parameters; and adjusting interior climate control for a zone corresponding with users in the zone and occupation climate parameters. In some embodiments, generating a number of fingerprint databases further includes: performing a single walkthrough of the building with the mobile electronic device; gathering spatial sensor data corresponding with the mobile electronic device during the single walkthrough, where the spatial sensor data corresponds with any of images WiFi signal strength, Bluetooth signal strength, and/or magnetic vector fingerprint captured along a path traversed during the walkthrough.

17 Claims, 6 Drawing Sheets

US 10,120,397 B1

INTERIOR CLIMATE CONTROL UTILIZING MULTIMODAL SENSOR POSITIONING

BACKGROUND

According to U.S. Department of energy, buildings in the United States are responsible for about 39% of $CO_2$ emissions and 73% of electricity consumption. This electrical usage is roughly divided equally between residential and commercial buildings. Depending on the specific use modality of the building, the dominant electricity consumers can be lighting and HVAC. Specifically for office buildings, data from the U.S. Energy Information Administration shows that lighting accounts for 39% and HVAC for 23% of electricity use. As such, any savings in lighting and HVAC in buildings, can result in substantial overall energy consumption in the United States.

Occupancy detection in current buildings is typically accomplished using passive infrared (PIR), Carbon Dioxide, and ultrasonic motion sensors installed expressly to determine occupancy and control building systems to reduce energy. Drawbacks to such explicit occupancy sensing include the cost of installing and maintaining sensors, limited accuracy, and lack of networking capabilities for data fusion and collection. One way to circumvent the cost associated with installing and maintaining occupancy sensors in buildings is to leverage existing WiFi infrastructure in commercial buildings. Existing WiFi based occupancy systems are experimental in nature, and generally exploit coarse grained information such as Authentication, Authorization and Accounting (AAA) logs of WiFi clients, and metadata information such WiFi MAC address and AP location within the building. This approach assumes prior knowledge of access points, and typically results in spatially coarse localization of the occupants. A lower cost and more accurate alternative to occupancy coupled with real-time climate control systems would be desirable.

As such, indoor climate control based on real-time occupancy detection utilizing multimodal sensor positioning is presented herein.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Methods for interior climate control of a building utilizing multimodal sensor positioning using an electronic mobile device are presented, the method including: causing the electronic mobile device to receive a building floor plan; generating a number of fingerprint databases corresponding with the building floor plan; determining a position of a user having a mobile electronic device in the building; receiving occupancy climate parameters; and adjusting interior climate control for a zone corresponding with the position of the user and a number of occupancy climate parameters. In some embodiments, generating a number of fingerprint databases further includes: performing a single walkthrough of the building with the mobile electronic device; gathering spatial sensor data corresponding with the mobile electronic device during the single walkthrough, where the spatial sensor data corresponds with, a number of images captured along a path traversed during the walkthrough, a number of WiFi scans captured along the path traversed during the walkthrough, a number of Bluetooth scans captured along the path traversed during the walkthrough a number of magnetic vectors captured along the path traversed during the walkthrough; aligning a path traversed during the walkthrough to the building floor plan; and generating at least an image fingerprint database, a WiFi fingerprint database, a Bluetooth fingerprint database and a magnetic vector database corresponding with a common coordinate frame. In some embodiments, determining the position of the user with an electronic mobile device in the building further includes: receiving any of the following singly or in combination: initial WiFi data corresponding with a start position of the user, initial image data corresponding with a start position of the user, initial Bluetooth data corresponding with a start position of the user, and receiving initial magnetic data corresponding with a start position of the user; and performing an initialization of the start position corresponding with the received data. In some embodiments, determining the position of the user in the building using particle filtering further includes: initializing the particles performing step detection on the mobile electronic device; and propagating a position of a number of particles at each step detected to track the mobile electronic device. In some embodiments, propagating a position of a number of particles at each step detected to track the user further includes; computing any of the following singly or in combination: a first weight of each of the number of particles based on a current WiFi observation; a second weight of each of the number of particles based on a current Bluetooth observation a third weight of each of the number of particles based on a current image observation; a fourth weight of each of the number of particles based on a current magnetic observation; resampling the number of particles to find a current position of the mobile electronic device based on the observations; and estimating the current position of the mobile electronic device. In some embodiments, adjusting interior climate control for the zone corresponding with the position of the user further includes: adjusting the interior climate control for the zone in response to a scheduled occupancy change; and adjusting the interior climate control for the zone in response to an occupancy change. In some embodiments, adjusting interior climate control for a zone corresponding with the position of the user further includes: adjusting the interior climate control for the zone accounting for any combination of the number of occupancy climate parameters.

In other embodiments, systems of electronic hardware for interior climate control of a building utilizing multimodal sensor positioning are presented including: an occupancy server having a processor for receiving a building floor plan, generating a number of fingerprint databases corresponding with the building floor plan, determining a position of a user in the building, receiving occupancy climate parameters, and adjusting interior climate control for a zone corresponding with the position of the user and a number of occupancy climate parameters; a mobile electronic device for capturing relevant data for determining the position of the user; and a Heating Ventilating and Air Conditioning (HVAC) and lighting control module for receiving input from the occupancy server for determining control configurations. In some embodiments, the mobile electronic device further controls the HVAC and lighting control module via the occupancy server. In some embodiments, generating a number of fingerprint databases further includes: performing a single walkthrough of the building with a mobile electronic device; gathering spatial sensor data corresponding with the mobile electronic device during the single walkthrough, where the spatial sensor data corresponds with at least one of, a number of images captured along a path traversed during the walkthrough, a number of WiFi scans captured along the path traversed during the walkthrough, a number of Bluetooth scans captured along the path traversed during the walkthrough, a number of magnetic vectors captured along the path traversed during the walkthrough; aligning a path traversed during the walkthrough to the building floor plan; and generating at least an image fingerprint database, a WiFi fingerprint database, a Bluetooth fingerprint database and a magnetic vector database corresponding with a common coordinate frame.

In other embodiments, computing device program products for interior climate control of a building utilizing multimodal sensor positioning using an electronic mobile device are presented, the method including: a non-transitory computer readable medium; first programmatic instructions for causing the electronic mobile device to receive a building floor plan; second programmatic instructions for generating a number of fingerprint databases corresponding with the building floor plan; third programmatic instructions for determining a position of a user having a mobile electronic device in the building; fourth programmatic instructions for receiving occupancy climate parameters; and fifth programmatic instructions for adjusting interior climate control for a zone corresponding with the position of the user and a number of occupancy climate parameters, where the programmatic instructions are stored on the non-transitory computer readable medium.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
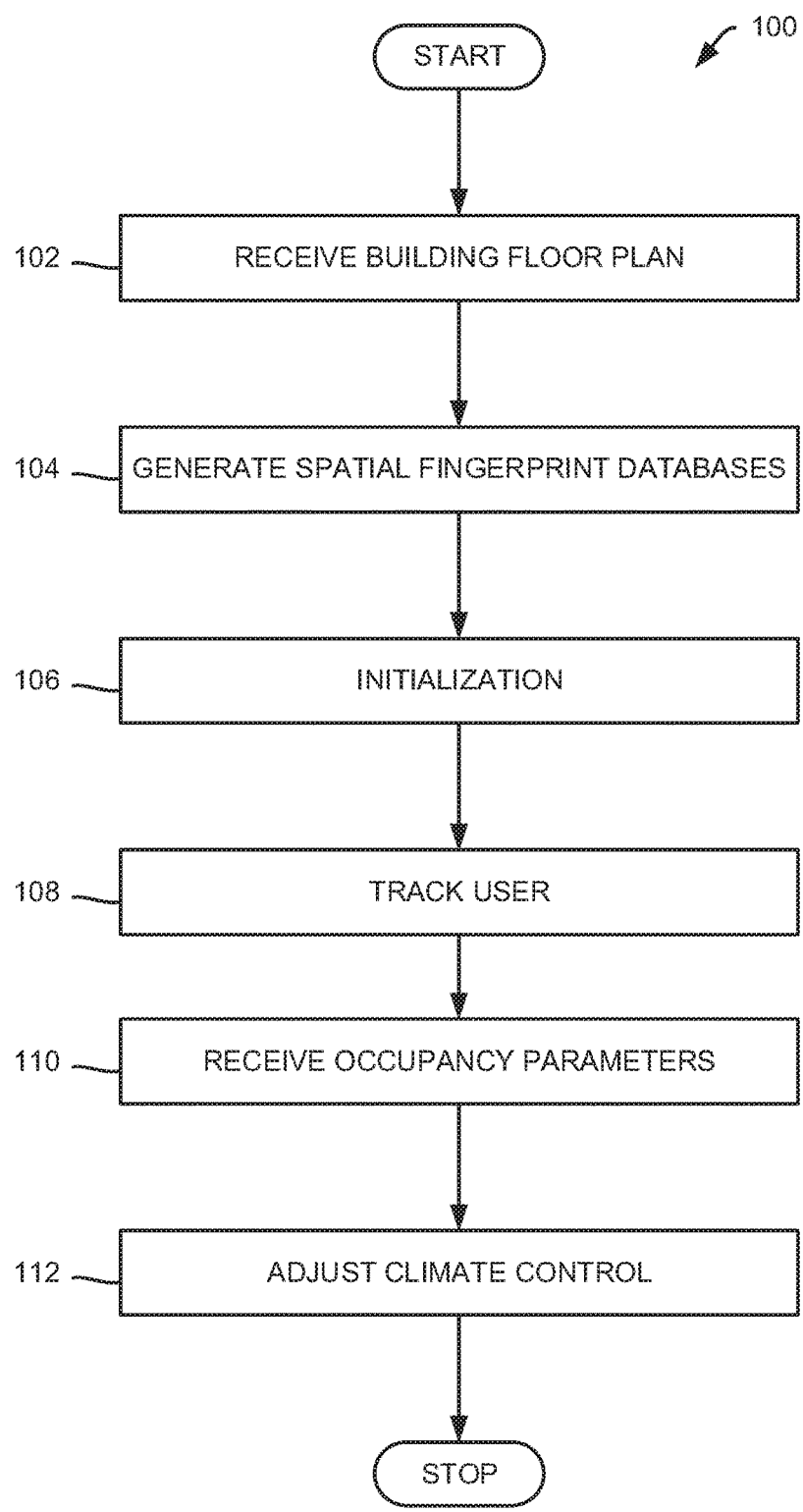
FIG. 1 is an illustrative flowchart of an overview of methods for interior climate control based on real-time occupancy detection utilizing multimodal sensor positioning in accordance with embodiments of the present invention.

As will be appreciated by one skilled in the art, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals/per se/, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments disclosed herein present real-time control of HVAC (and lighting) in buildings without having to deploy, install, or maintain any sensors. The disclosed approach is based on a fast and automated WiFi, and/or Bluetooth, and/or magnetic, and/or image fingerprinting method which simply involves a human operator walking through a building while holding a smart phone or other mobile electronic device in his or her hand and/or strapping a foot inertial measurement unit (IMU) on his or her foot. The information collected from this walkthrough may be used to build a spatial WiFi, and/or Bluetooth, and/or, magnetic and/or image reference database of the building, which can later be used by an "app" on occupants' mobile electronic device such as a cell phone to localize them in the building in real-time. Aggregation of all occupants' location can be used to paint a spatially and temporally accurate real-time occupancy map of the building which may then be utilized to reduce energy consumption by adjusting the amount of mixed outside fresh air and controlling the temperature in HVAC based on the number and preferences of occupants in each zone, or by turning off HVAC and lighting in rooms and areas with no occupancy. Methods disclosed exploit that fact that in most commercial and industrial buildings, occupants carry a mobile electronic device or mobile communication device with them throughout their workday. Utilizing methods herein, occupants may specify their temperature, and/or humidity, and/or lighting preferences during initial download of the "app" as well as in their day-to-day use. This control maximizes their comfort level wherever they are within the building at the same time as reducing energy consumption in the building. Indoor climate control is made without the occupants ever having to specify their location within the building. In embodiments, over time, the method may learn the thermal profile of each user and may systematically widen their temperature setpoint range, without compromising their comfort and while achieving substantial HVAC energy savings. In addition, reporting the temperature sensor reading on the occupant's mobile electronic device may augment or replace existing feedback mechanisms to the HVAC system by wall sensors which may be mis-calibrated, dysfunctional, exposed to sunlight, in a part of the room where the air is not well-mixed, placed near internal loads such as computer monitors, or subject to any other source of disruption in the air temperature.

FIG. 1 is an illustrative flowchart 100 of an overview of methods for interior climate control based on real-time occupancy detection utilizing multimodal sensor positioning in accordance with embodiments of the present invention. At least some of the illustrated steps are disclosed in further detail below for various figures. At a first step 102, a building floor plan may be received. In embodiments, building floor plans may be received from any source known in the art. In one embodiments building floor plans may be received from a walkthrough scan and map of the building as illustrated, for example in U.S. patent application Ser. No. 14/855,742 entitled 3D SPHERICAL IMAGE SYSTEM, which is hereby incorporated by reference. At a next step 104, the method generates a plurality of spatial fingerprint databases aligned with the building floor plan. In general, a spatial fingerprint database as contemplated herein represents spatial sensor data corresponding to a given modality such as WiFi, Bluetooth, magnetic, or imagery gathered by a mobile electronic device along a path that may be aligned within a building floor plan. A spatial fingerprint database represents a table with many rows where each row consists of a location in a building and the associated value of that sensing modality at that location. The measurement of a different sensor for example in a mobile device with unknown position can be looked up against the sensor values in each row of the fingerprint database table in order to deduce the position of the mobile device. A step 104 will be discussed in further detail below for FIG. 2. At a step 106, the method performs initialization. As utilized herein, initialization provides a starting position of a user or first fix of a user. That is, initialization represents an initial estimate of a user's position after matching one set of measurements consisting of one or multiple sensor modalities. In accordance with embodiments provided herein, it is assumed that a user's position corresponds with a mobile electronic device carried by the user. Thus, it may be assumed that a user's position is substantially similar to a mobile electronic device's position that is being carried by the user. A step 106 will be discussed in further detail below for FIG. 3.

At a next step 108, a user may be tracked. Tracking a user may be accomplished through multimodal sensor fusion. It may be appreciated that indoor positioning is not easily accomplished since there is no GPS inside buildings. Indoor positioning resists simple signal triangulation because of the various architectural features of the building. Thus, for example, a line-of-sight reckoning may be not be functional in a highly chambered building. Embodiments utilized herein may fuse information from sensors such as Bluetooth, WiFi, magnetic, image camera, and inertial sensors to provide accurate and efficient positioning data. It may be noted that in embodiments, tracking is an optional step. That is, in some embodiments, a user's position may be continuously tracked. However, in other embodiments, initialization as described above may be repeated at discrete intervals to provide a current user position. One advantage of continuous tracking is that continuous tracking may provide more accurate positioning data over a series of initializations or first fixes. A step 108 will be discussed in further detail below for FIG. 4. At a next step 110, the method receives occupancy climate parameters. In general, occupancy parameters may be utilized to configure indoor climate control equipment. Typically, indoor climate control is managed through the heating and cooling of an airflow and adjusting the amount of fresh outside air being mixed. Indoor climate control adjustment for occupancy in embodiments may be a function of many factors such user defined climate settings, mobile electronic device temperature readings, user schedules, building schedules, meeting schedules, building control settings, interior temperature readings, exterior temperature readings, airflow equipment capacities, heating equipment capacities, and cooling equipment capacities, or any other number of factors without limitation. At a next step 110, the method adjusts interior climate control for a zone corresponding with the number of users positioned in that zone, their preferences and occupancy climate parameters, whereupon the method ends. Where conventional indoor control systems rely on either predefined parameters or direct user intervention to adjust indoor climate control, present embodiments may make indoor climate control changes based on users' positions inside the building, users' temperature preferences, or mobile electronic device temperature readings that provide a more responsive system over conventional solutions. A step 110 will be discussed in further detail below for FIG. 5.

Figure 2:
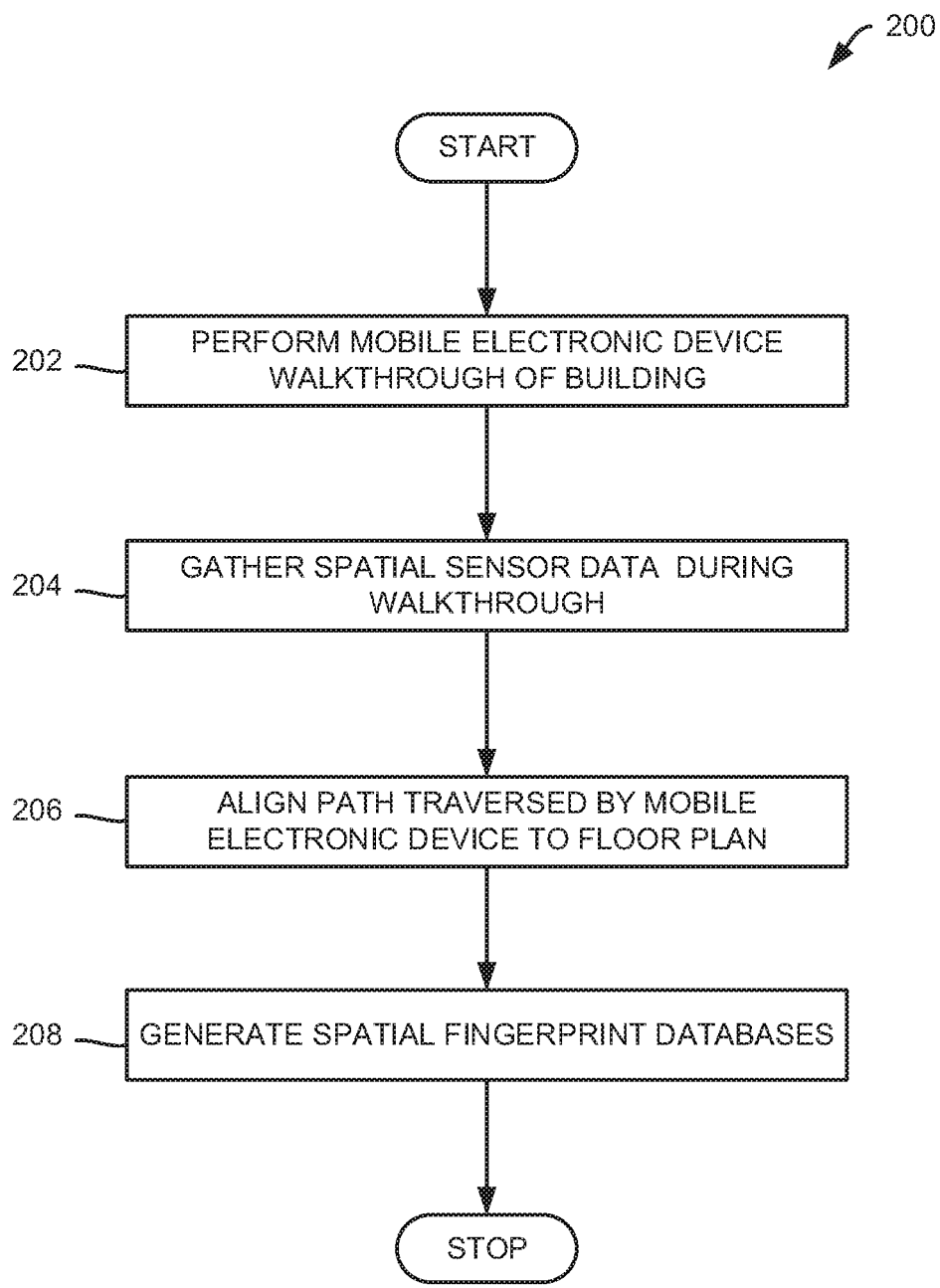
FIG. 2 is an illustrative flowchart of database generation in accordance with embodiments of the present invention.

FIG. 2 is an illustrative flowchart 200 of database generation in accordance with embodiments of the present invention. In particular, flowchart 200 is a further representation of a step 104 of FIG. 1. As noted above, in general, a spatial fingerprint database as contemplated herein represents sensor spatial sensor data gathered by a mobile electronic device along a path that may be aligned within a building floor plan. In embodiments, a spatial fingerprint database represents a table with many rows where each row consists of a location in a building and an associated value of the sensing modality observed at that location. The measurement of a different sensor, for example in a mobile device with an unknown position may be compared with the sensor values in each row of the fingerprint database table in order to deduce the position of the mobile device. At a step 202, a single walkthrough of the building may be performed with a mobile electronic device. In embodiments, mobile electronic devices may include, for example, a smart phone, a tablet, a capture device, and an electronic watch without limitation. Any device capable of capturing WiFi scans, images, magnetic field, Bluetooth or any combination of the above may be utilized in embodiments provided herein. Optionally, a foot mounted IMU may be strapped during the walkthrough to improve the positioning of the capture device. At a next step 204, the method gathers spatial sensor data corresponding with the mobile electronic device during the single walkthrough. As contemplated herein, spatial sensor data corresponds with images captured along the path or trajectory traversed during the walkthrough, with WiFi scans captured along the path traversed during the walkthrough, with Bluetooth scans captured along the path traversed during the walkthrough, and with magnetic vectors captured along the path traversed during the walkthrough. Images, Bluetooth, and WiFi scans along with magnetic vectors may be captured periodically by fixed interval or by some other interval determined by the user. In order to track the path traversed during the capture walkthrough, an Inertial Measurement Unit (IMU) and/or a camera of the mobile electronic device may be provided for tracking its movement in embodiments. Optionally, a foot mounted IMU may be strapped to the operator carrying the capture device in order to improve tracking the movement of the operator and the mobile electronic device carried by the operator.

At a step 206, the method aligns a path traversed by the mobile electronic device during the walkthrough to the building floor plan and generates spatial fingerprint databases such as: an image fingerprint database, a WiFi fingerprint database, a Bluetooth fingerprint database, and a magnetic vector database corresponding with a common coordinate frame, whereupon the method ends. These spatial fingerprint databases provide known positions for known observed data. For example an image taken by the mobile electronic device may be aligned within a building plan. In this manner, position information corresponding with the image along with the image may be stored for future access. When a subsequent image is acquired, as will be discussed in further detail below, the newly acquired image may be compared with the database image and position to determine the position from which the acquired image was taken. In this manner, the position of the user may be found.

Figure 3:
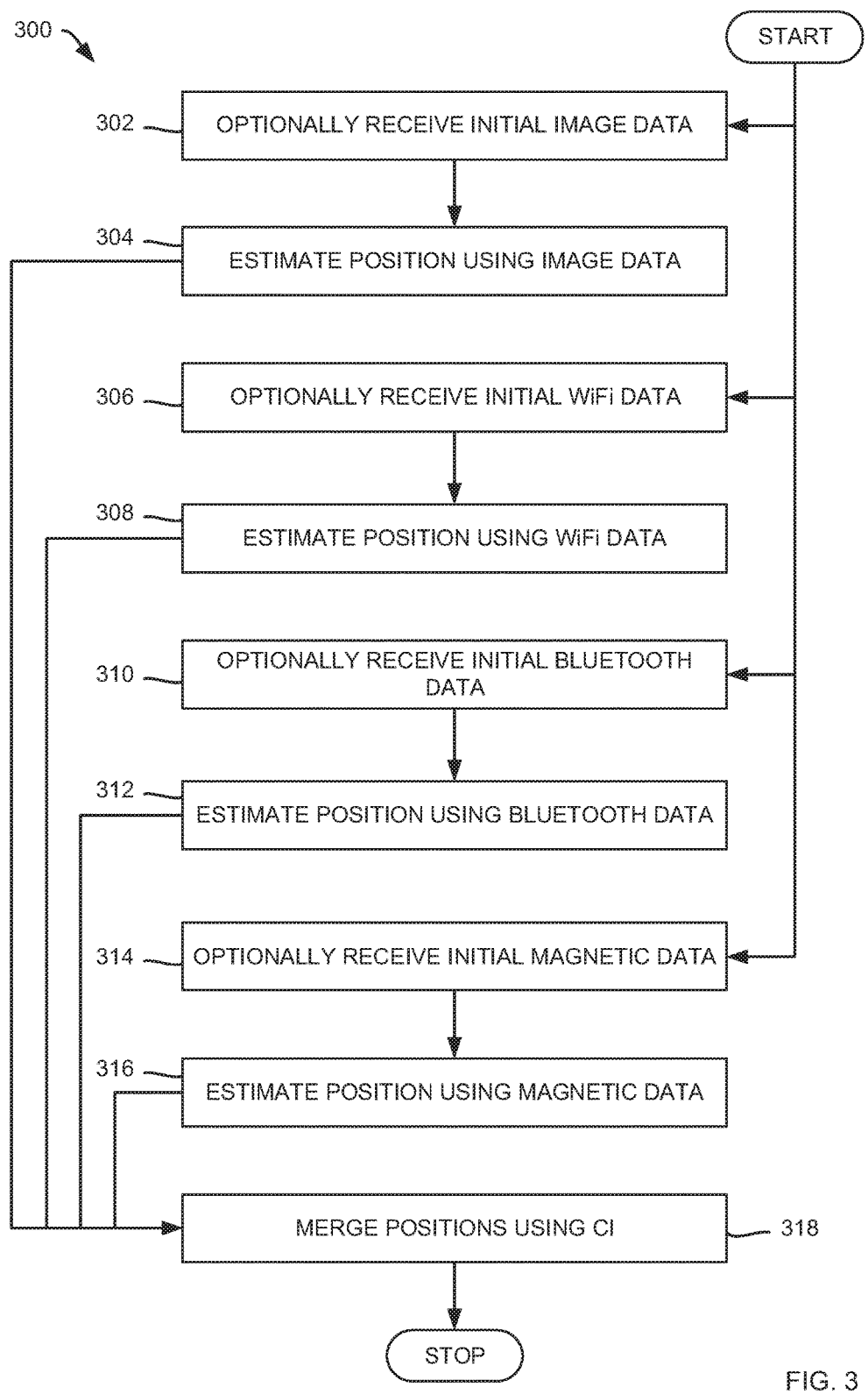
FIG. 3 is an illustrative flowchart of initialization in accordance with embodiments of the present invention.

FIG. 3 is an illustrative flowchart 300 of initialization in accordance with embodiments of the present invention. In particular, flowchart 300 is a further representation of a step 106 of FIG. 1. As noted above, initialization represents an initial estimate or first fix of a user's position. It may be first noted that in embodiments provided, steps 302, 306, 308, and 310 each represent receiving different types of data, namely image data, WiFi data, Bluetooth data, and magnetic data. Methods provided herein contemplate utilizing any of the data singly or in combination to determine an initial estimate of a user's position. By utilizing multiple modalities for position estimates, a more robust and accurate position determining system may be achieved. As such, at a first step 302, the method optionally receives initial image data from the user at a start position. Image data, as contemplated herein, is an image taken by the user a particular location. While embodiments provided herein may utilize image data for determining a user's position, this step is optional and may be omitted in some embodiments. At a next step 304, the method estimates a position using image data. For example, a user may take a picture (i.e. initial image data) of the area around him/her. A matching image in the image fingerprint database may be found and used to compute the camera pose of the initial image. In some embodiments, methods may further generate a confidence interval (CI) associated with position estimate to be used for further accuracy.

At a step 306, the method optionally receives initial WiFi data from the user at a start position. In general, WiFi data corresponds with signal strength between a mobile electronic device and a WiFi infrastructure already present inside a building. That is, WiFi data corresponds with the signal strength between a mobile device and all WiFi routers (or access points) being sensed by that mobile device. It is therefore a vector of numbers. The dimension of that vector represents the number of WiFi routers sensed by that mobile device. While embodiments provided herein may utilize WiFi data for determining a user's position, this step is optional and may be omitted in some embodiments. At a next step 308, the method estimates a position using WiFi data. In some embodiments, methods may further generate a CI associated with position estimate to be used for further accuracy. At a step 310, the method optionally receives initial Bluetooth data from the user at a start position. In general, like WiFi data, Bluetooth data corresponds with signal strength between a mobile electronic device and a Bluetooth infrastructure already present inside a building. While embodiments provided herein may utilize Bluetooth data for determining a user's position, this step is optional and may be omitted in some embodiments. At a next step 312, the method estimates a position using Bluetooth data. In some embodiments, methods may further generate a CI associated with position estimate to be used for further accuracy. At a step 314, the method optionally receives initial magnetic data from the user at a start position. Magnetic vector readings may be collected from mobile electronic devices equipped with an appropriate sensor such as a compass or magnetometer. In some embodiments, tilt compensation may be performed. While embodiments provided herein may utilize magnetic data for determining a user's position, this step is optional and may be omitted in some embodiments. At a next step 316, the method estimates a position using magnetic data. In some embodiments, methods may further generate a CI associated with position estimate to be used for further accuracy. At a next step 318, the method merges all estimates made to determine the initial position, whereupon the method ends. In some embodiments the method may further utilize all CIs to merge estimates from multiple sensor modalities to determine the initial position, which may provide a more accurate estimate than if CIs were not considered.

Figure 4:
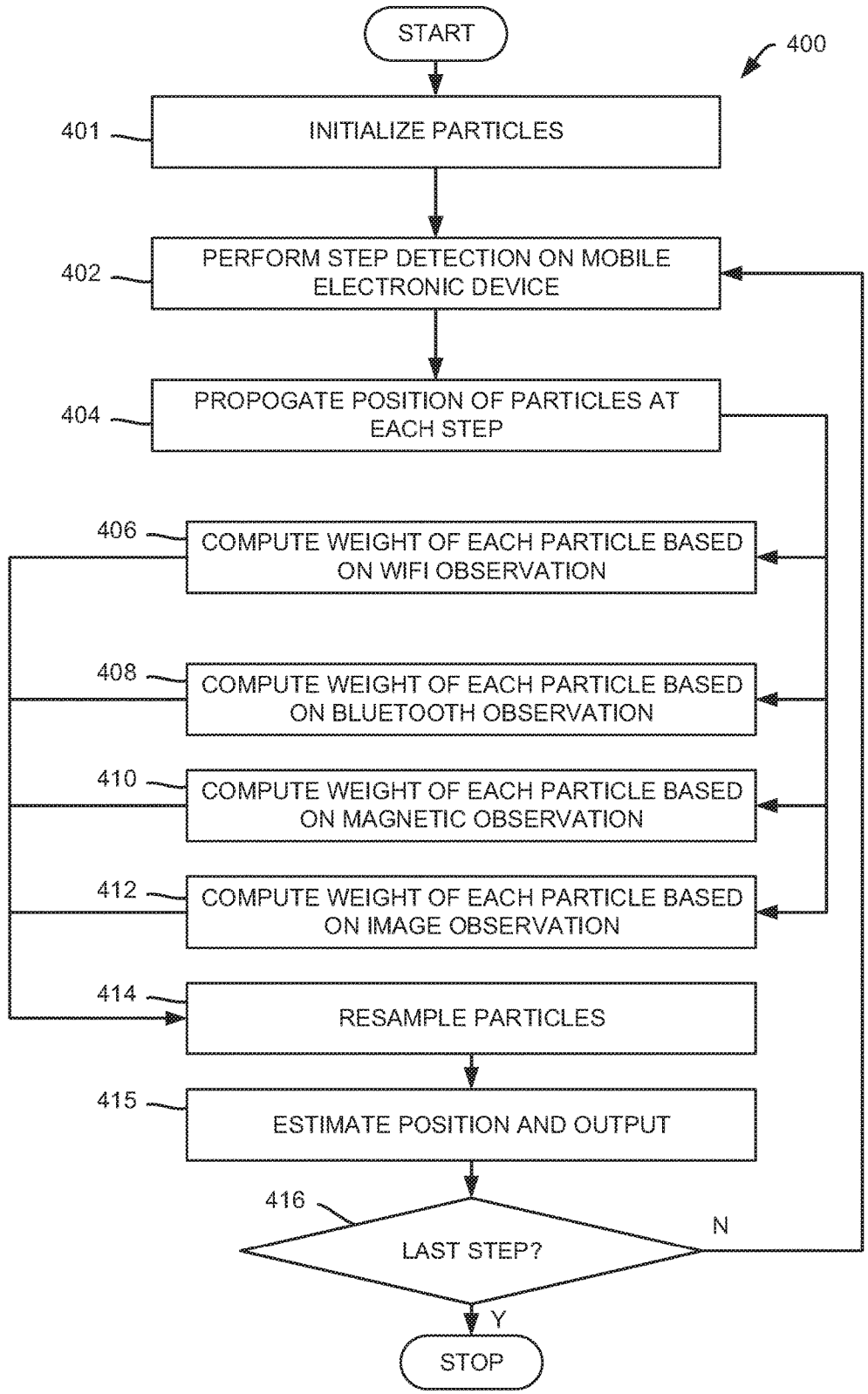
FIG. 4 is an illustrative flowchart of tracking a user in accordance with embodiments of the present invention.

FIG. 4 is an illustrative flowchart 400 of tracking a user in accordance with embodiments of the present invention. In particular, flowchart 400 is a further representation of a step 108 of FIG. 1. As noted above, tracking a user may be accomplished through multimodal sensing. It may be appreciated that indoor positioning is not easily accomplished. Indoor positioning resists simple signal triangulation because of the various architectural features of the building. Thus, for example, a line-of-sight reckoning may be not be functional in a highly chambered building. Embodiments utilized herein may fuse information from images, and/or WiFi, and/or magnetic, and/or Bluetooth and inertial sensors to provide accurate and efficient positioning data. In the following steps, particle filter methodology may be employed. At a first step 401, the method initializes position and orientation of particles. The position of the particles may be initialized using methods described for flowchart 300 disclosed above. Optionally the CI for different sensor modalities in flowchart 300 can be used to determine the distribution of the position of particles during initialization. One method to initialize the angle of each particle is to use the yaw angle from the gyroscope on the electronic mobile device. In other embodiments, any other manner for initializing particles known in the art may be utilized without limitation. At a next step 402, the method performs a step detection on a mobile electronic device. Step detection may be done using the accelerometer on the mobile electronic device. Well-known algorithms are used to detect a step, estimate its length and estimate the direction based on the change in the orientation as reported by the device. At a next step 404, the method uses the parameters of the step in step 402 to propagate the position and orientation of the particles after each step. Propagation proceeds by any of the following steps 406 to 412 singly or in combination. Methods provided herein utilize multimodal sensor positioning to determine the location of a user. Because indoor environments are particularly challenging, methods may utilize any or all of the sensor modes presented herein. Thus, determining a user's position is not limited to one sensor modality that may or may not be available in different areas of the building.

As such, at a step 406, the method computes the weight of each particle based on a WiFi observation. In embodiments, WiFi scans may be performed at selected intervals. In some embodiments, WiFi scans may be performed approximately every three seconds (⅓ HZ). After each WiFi scan, the weight of each particle is computed based on matching against a WiFi fingerprint database. In one embodiment, methods utilize a Redpin score between the observed WiFi fingerprint and the WiFi fingerprint close to the particle under consideration in order to compute the particle's weight. In other embodiments, any method of scoring known in the art may be utilized without limitation. At a step 408, the method computes the weight of each particle based on a Bluetooth observation. In embodiments, Bluetooth scans may be performed at selected intervals. After each Bluetooth scan, the weight of each particle is computed based on matching against a Bluetooth fingerprint database. In other embodiments, any method of scoring known in the art may be utilized without limitation.

At a step 410, the method computes the weight of each particle based on a magnetic observation. Magnetic vector readings from a mobile electronic device may be collected periodically. In embodiments, magnetic vector readings may be collected at a frequency of approximately 200 HZ. From these readings, an observed magnetic vector may be utilized to update the weight of each particle in the filter using the magnetic fingerprint database periodically. In one embodiment, the weight of the particle may be updated by using the magnitude of the observed magnetic vector. In another embodiment, the weight of the particle may be updated by using the orientation of the magnetic vector. In yet another embodiment, the weight of the particle may be computed by a) computing one weight based on the magnitude of the observed magnetic vector, b) computing one weight based on the orientation of the observed magnetic vector, and c) multiplying those two weights to provide the weight of the particle. In other embodiments, any method of weighting known in the art may be utilized without limitation. At a step 412, the method computes the weight of each particle based on an image observation. In embodiments, every time a picture is taken, that image may be utilized to compute the weight of each particle based on matching against an image fingerprint database. In embodiments, images may be collected continuously, at intervals, or randomly without limitation. In the example of continuous collection, images may be sampled at a selected interval.

At a next step 414, the method resamples the particles. In embodiments, particles may be resampled at a selected interval. In some embodiments, the selected interval may be a specified number of steps, a time interval, or an observation interval of any of the observed modalities. Once resampling occurs, the particles are in new positions. Therefore, the next time a step is detected it is these resampled particles that are "propagated." Similarly, the next time there is an observation of some kind it is these resampled particles for which weights may be computed. At a next step, the method estimates a position of the user and outputs the position. In embodiments, any method known in the art may be utilized to estimate the position of the mobile electronic device and therefore the user. In one embodiments finding the centroid of the particles may be used to determine position. The method continues to a step 416 to determine whether the last step has been performed. In practice, the last step is performed when there no change in position of the mobile electronic device. If the method determines at a step 416, that the last step has not been taken, the method returns to a step 404. If the method determines at a step 416, that no new steps have been detected, the method ends.

Figure 5:
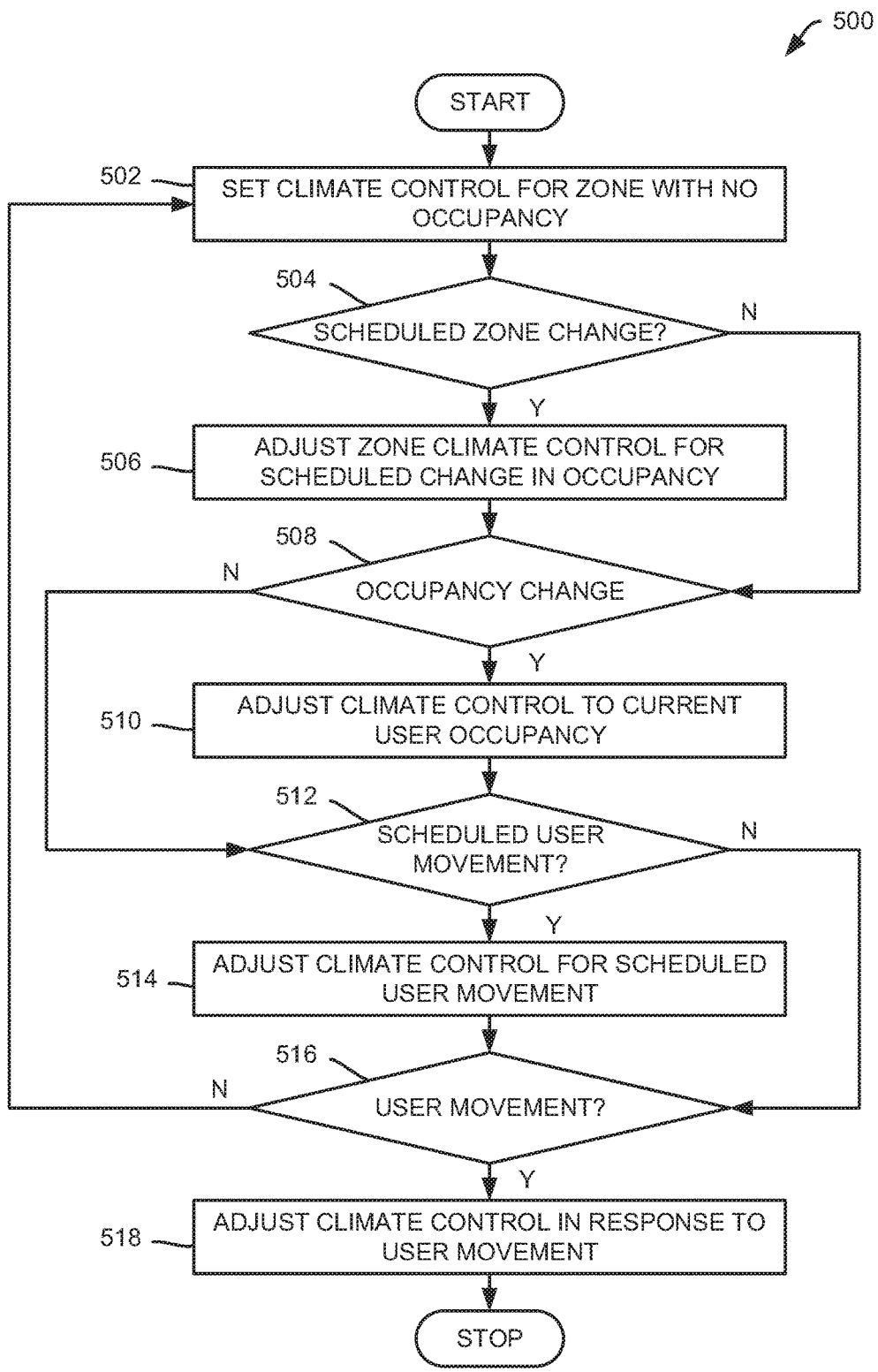
FIG. 5 is an illustrative flowchart of adjusting climate control in accordance with embodiments of the present invention.

FIG. 5 is an illustrative flowchart of adjusting climate control in accordance with embodiments of the present invention. In particular, flowchart 500 is further representation of a step 112 of FIG. 1. At a first step 502, the method sets climate control for a zone having no occupancy. This step represents an initial condition for a zone that is currently empty. At a next step 504, the method determines whether a change in occupancy for the zone is scheduled. This condition may be satisfied by comparison with a meeting room schedule in embodiments. If the method determines at a step 504 that a change in occupancy for the zone is scheduled, the method continues to a step 506 to adjust interior climate control for zone in response to a scheduled occupancy, whereupon the method continues to a step 508. In embodiments, adjusting the interior climate control for the zone may account for any combination of occupancy climate parameters such as: user defined climate settings, mobile electronic device temperature readings, user schedules, building schedules, meeting schedules, building control settings, interior temperature readings, exterior temperature readings, airflow equipment capacities, heating equipment capacities, and cooling equipment capacities without limitation.

If the method determines at a step 504 that no change in occupancy for the zone is scheduled, the method continues to a step 508 to determine whether a zone has experienced an occupancy change. This condition occurs when a person or persons having a mobile electronic device utilizing methods disclosed herein newly occupies a room. If the method determines at a step 508 that a zone has experienced an occupancy change, the method continues to a step 510 to adjust the interior climate control for the zone in response to an occupancy change, whereupon the method continues to a step 512. If the method determines at a step 508 that a zone has not experienced an occupancy change, the method continues to a step 512 to determine whether there is a scheduled user movement into or out of a zone. If the method determines at a step 512 that there is a scheduled user movement into or out of a zone, the method continues to a step 514 to adjust interior climate control for a zone based on a scheduled user movement, whereupon the method continues to a step 516. If the method determines at a step 512 that there is no scheduled user movement into or out of a zone, the method continues to a step 516 to determine whether there is actual user movement into or out of a zone. If the method determines at a step 516 that there is actual user movement into or out of a zone, the method continues to a step 518 to adjust interior climate control of a zone in response to an actual user movement, whereupon the method stops. If the method determines at a step 516 that there is no actual user movement into or out of a zone, it ends. In embodiments, adjusting the interior climate control for the zone may account for any combination of occupancy climate parameters such as: user defined climate settings, mobile electronic device temperature readings, user schedules, building schedules, meeting schedules, building control settings, interior temperature readings, exterior temperature readings, airflow equipment capacities, heating equipment capacities, and cooling equipment capacities without limitation.

Figure 6:
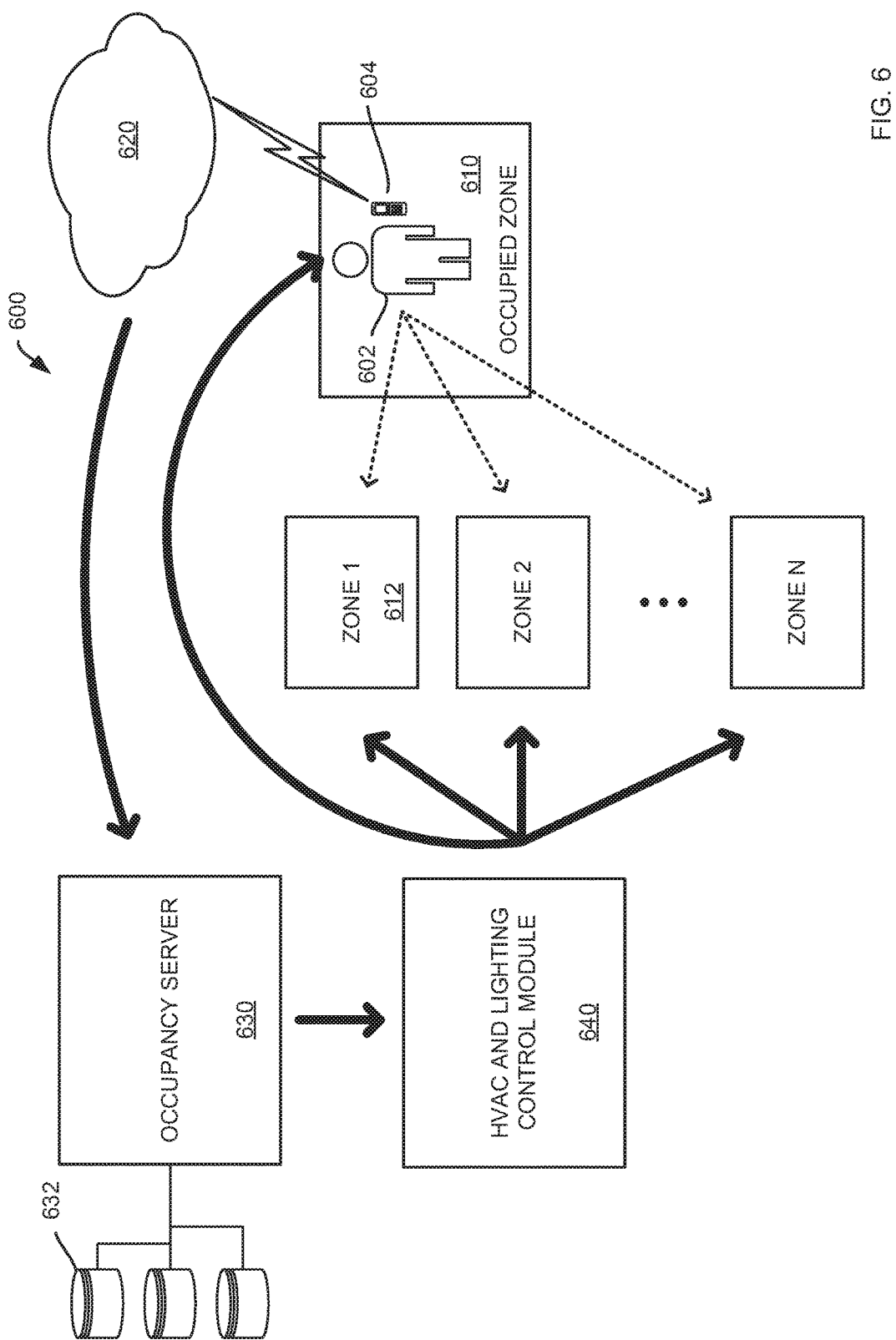
FIG. 6 is an illustrative representation of a system for interior climate control based on real-time occupancy detection utilizing multimodal sensor positioning in accordance with embodiments of the present invention.

FIG. 6 is an illustrative representation of a system 600 for interior climate control utilizing multimodal sensor positioning in accordance with embodiments of the present invention. As illustrated, user 602 may be positioned in occupied zone 610 and may carry or have near his person mobile electronic device 604. Further illustrated, mobile electronic device 604 may be in electronic communication by any wireless connection 620 to occupancy server 630. In embodiments, mobile electronic devices may include any wireless enabled mobile electronic device such as, for example, a smart phone, a cellular phone, a tablet, a portable laptop, an electronic watch without limitation. Occupancy server 630 may further include any number of fingerprint databases 632. Occupancy server 630 may be further in electronic communication with Heating Ventilating and Air Conditioning (HVAC) and lighting control module 640. Utilizing methods provided herein, user 602 may move from an occupied zone to any other zone 612 in a building. The movement may be scheduled or spontaneous. Furthermore, the movement is tracked utilizing multimodal sensor positioning in real-time. That is, image, WiFi, Bluetooth, image, and magnetic positioning modalities may be used singly or in combination to quickly and accurately determine the position of the user 602. Mobile electronic device 604 may be utilized to capture relevant data for determining the position of the user. In addition, mobile electronic device 604 may be utilized to provide temperature information so that HVAC and lighting control module 640 may receive additional input for determining control configurations. In some embodiments, the mobile electronic device may be enabled to directly control HVAC and lighting control modules.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods, computer program products, and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for interior climate control of a building utilizing multimodal sensor positioning using an electronic mobile device, the method comprising:
    causing the electronic mobile device to receive a building floor plan;
    generating a plurality of fingerprint databases corresponding with the building floor plan;
    determining a position of a user having a mobile electronic device in the building, wherein determining the position of the user with an electronic mobile device in the building further comprises,
        receiving any of the following singly or in combination,
            initial WiFi data corresponding with a start position of the user,
            initial image data corresponding with a start position of the user,
            initial Bluetooth data corresponding with a start position of the user, and
            receiving initial magnetic data corresponding with a start position of the user, and
        performing an initialization of the start position corresponding with the received data;
    receiving occupancy climate parameters; and
    adjusting interior climate control for a zone corresponding with the position of the user and a plurality of occupancy climate parameters.

2. The method of claim 1, wherein generating a plurality of fingerprint databases further comprises:
    performing a single walkthrough of the building with the mobile electronic device;
    gathering spatial sensor data corresponding with the mobile electronic device during the single walkthrough, wherein the spatial sensor data corresponds with at least one of,
        a plurality of images captured along a path traversed during the walkthrough,
        a plurality of WiFi scans captured along the path traversed during the walkthrough,
        a plurality of Bluetooth scans captured along the path traversed during the walkthrough
        a plurality of magnetic vectors captured along the path traversed during the walkthrough;
    aligning a path traversed during the walkthrough to the building floor plan; and
    generating at least an image fingerprint database, a WiFi fingerprint database, a Bluetooth fingerprint database and a magnetic vector database corresponding with a common coordinate frame.

3. The method of claim 2, further comprising: providing an Inertial Measurement Unit (IMU) which may or may not be mounted on a shoe for tracking the path traversed during the walkthrough.

4. The method of claim 1, wherein determining the position of the user in the building using particle filtering further comprises:
    initializing the particles
    performing step detection on the mobile electronic device; and
    propagating a position of a plurality of particles at each step detected to track the mobile electronic device.

5. The method of claim 4, wherein propagating a position of a plurality of particles at each step detected to track the user further comprises;
    computing any of the following singly or in combination:
        a first weight of each of the plurality of particles based on a current WiFi observation;
        a second weight of each of the plurality of particles based on a current Bluetooth observation
        a third weight of each of the plurality of particles based on a current image observation;
        a fourth weight of each of the plurality of particles based on a current magnetic observation;
    resampling the plurality of particles to find a current position of the mobile electronic device based on the observations; and
    estimating the current position of the mobile electronic device.

6. The method of claim 5, further comprising:
    outputting the current position of the mobile electronic device.

7. The method of claim 1, wherein the plurality of occupancy climate parameters are selected from the group consisting of: user defined climate settings, mobile electronic device temperature readings, user schedules, building schedules, meeting schedules, building control settings, interior temperature readings, exterior temperature readings, airflow equipment capacities, heating equipment capacities, and cooling equipment capacities.

8. The method of claim 7, wherein adjusting interior climate control for the zone corresponding with the position of the user further comprises:
    adjusting the interior climate control for the zone in response to a scheduled occupancy change; and
    adjusting the interior climate control for the zone in response to an occupancy change.

9. The method of claim 8, wherein adjusting interior climate control for a zone corresponding with the position of the user further comprises:
    adjusting the interior climate control for the zone accounting for any combination of the plurality of occupancy climate parameters.

10. A system of electronic hardware for interior climate control of a building utilizing multimodal sensor positioning comprising:
    an occupancy server having a processor for
        receiving a building floor plan,
        generating a plurality of fingerprint databases corresponding with the building floor plan, wherein generating a plurality of fingerprint databases further comprises:
            performing a single walkthrough of the building with a mobile electronic device,
            gathering spatial sensor data corresponding with the mobile electronic device during the single walkthrough, wherein the spatial sensor data corresponds with at least one of,
  a plurality of images captured along a path traversed during the walkthrough,
  a plurality of WiFi scans captured along the path traversed during the walkthrough,
  a plurality of Bluetooth scans captured along the path traversed during the walkthrough,
  a plurality of magnetic vectors captured along the path traversed during the walkthrough;
aligning a path traversed during the walkthrough to the building floor plan; and
generating at least an image fingerprint database, a WiFi fingerprint database, a Bluetooth fingerprint database and a magnetic vector database corresponding with a common coordinate frame;
determining a position of a user in the building,
receiving occupancy climate parameters, and
adjusting interior climate control for a zone corresponding with the position of the user and a plurality of occupancy climate parameters;
a mobile electronic device for capturing relevant data for determining the position of the user; and
a Heating Ventilating and Air Conditioning (HVAC) and lighting control module for receiving input from the occupancy server for determining control configurations.

11. The system of claim 10, wherein the mobile electronic device further controls the HVAC and lighting control module via the occupancy server.

12. The system of claim 10, wherein the plurality of occupancy climate parameters are selected from the group consisting of: user defined climate settings, mobile electronic device temperature readings, user schedules, building schedules, meeting schedules, building control settings, interior temperature readings, exterior temperature readings, airflow equipment capacities, heating equipment capacities, and cooling equipment capacities.

13. The system of claim 10, wherein adjusting interior climate control for the zone corresponding with the position of the user further comprises:
  adjusting the interior climate control for the zone in response to a scheduled occupancy change; and
  adjusting the interior climate control for the zone in response to an occupancy change.

14. The system of claim 10, wherein adjusting interior climate control for a zone corresponding with the position of the user further comprises:
  adjusting the interior climate control for the zone accounting for any combination of the plurality of occupancy climate parameters.

15. A computing device program product for interior climate control of a building utilizing multimodal sensor positioning using an electronic mobile device, the method comprising:
  a non-transitory computer readable medium;
  first programmatic instructions for causing the electronic mobile device to receive a building floor plan;
  second programmatic instructions for generating a plurality of fingerprint databases corresponding with the building floor plan;
  third programmatic instructions for determining a position of a user having a mobile electronic device in the building, wherein third programmatic instructions for determining the position of the user with an electronic mobile device in the building further comprises:
    tenth programmatic instructions for receiving any of the following singly or in combination:
      initial WiFi data corresponding with a start position of the user, initial image data corresponding with a start position of the user,
      initial Bluetooth data corresponding with a start position of the user, and
      receiving initial magnetic data corresponding with a start position of the user, and
    eleventh programmatic instructions for performing an initialization of the start position corresponding with the received data;
  fourth programmatic instructions for receiving occupancy climate parameters; and
  fifth programmatic instructions for adjusting interior climate control for a zone corresponding with the position of the user and a plurality of occupancy climate parameters, wherein the programmatic instructions are stored on the non-transitory computer readable medium.

16. The computing device program product of claim 15, wherein second programmatic instructions for generating a plurality of fingerprint databases further comprises:
  sixth programmatic instructions for performing a single walkthrough of the building with the mobile electronic device;
  seventh programmatic instructions for gathering spatial sensor data corresponding with the mobile electronic device during the single walkthrough, wherein the spatial sensor data corresponds with at least one of,
    a plurality of images captured along a path traversed during the walkthrough,
    a plurality of WiFi scans captured along the path traversed during the walkthrough,
    a plurality of Bluetooth scans captured along the path traversed during the walkthrough
    a plurality of magnetic vectors captured along the path traversed during the walkthrough;
  eighth programmatic instructions for aligning a path traversed during the walkthrough to the building floor plan; and
  ninth programmatic instructions for generating at least an image fingerprint database, a WiFi fingerprint database, a Bluetooth fingerprint database and a magnetic vector database corresponding with a common coordinate frame.

17. The computing device program product of claim 15, wherein third programmatic instructions for determining the position of the user in the building using particle filtering further comprises:
  twelfth programmatic instructions for initializing the particles
  thirteenth programmatic instructions for performing step detection on the mobile electronic device;
  fourteenth programmatic instructions for propagating a position of a plurality of particles at each step detected to track the mobile electronic device, wherein fourteenth programmatic instructions for propagating a position of a plurality of particles at each step detected to track the user further comprises;
  fifteenth programmatic instructions for computing any of the following singly or in combination:
    a first weight of each of the plurality of particles based on a current WiFi observation;
    a second weight of each of the plurality of particles based on a current Bluetooth observation
    a third weight of each of the plurality of particles based on a current image observation;

a fourth weight of each of the plurality of particles based on a current magnetic observation;
sixteenth programmatic instructions for resampling the plurality of particles to find a current position of the mobile electronic device based on the observations; and
seventeenth programmatic instructions for estimating the current position of the mobile electronic device.

* * * * *